United States Patent [19]

Ichikawa et al.

[11] Patent Number: 5,581,410
[45] Date of Patent: Dec. 3, 1996

[54] RESIN-COUPLED OPTICAL ELEMENT AND METHOD OF PRODUCTION

[75] Inventors: Masanori Ichikawa, Ibaraki-ken; Koji Nakada, Kanagawa-ken; Takayuki Akiyama, Tokyo, all of Japan

[73] Assignee: Nikon Corporation, Tokyo, Japan

[21] Appl. No.: 296,601

[22] Filed: Aug. 29, 1994

[30] Foreign Application Priority Data

Sep. 1, 1993 [JP] Japan .................... 5-240740

[51] Int. Cl.$^6$ ........................ G02B 5/22
[52] U.S. Cl. ........................ 359/642; 359/885
[58] Field of Search ................ 359/642, 885, 359/890

[56] References Cited

U.S. PATENT DOCUMENTS 4,261,645  4/1981  Sawamura et al. .............. 359/586
5,361,168  11/1994  Arai et al. ..................... 359/642

FOREIGN PATENT DOCUMENTS 63-157103  6/1988  Japan .

Primary Examiner—Scott J. Sugarman
Attorney, Agent, or Firm—Oliff & Berridge

[57] ABSTRACT

A resin-coupled lens has a resin layer on at least one surface of the lens and has a light-shielding membrane, wherein the edge surface of the outermost perimeter of the resin layer is covered by the light shielding membrane. A production method for the resin-coupled lens includes a resin layer formation process that forms a resin layer on at least one surface of the base material of the lens, a light-shielding membrane formation process that forms a light-shielding membrane on the edge surface of the outermost perimeter of the resin layer by applying a light-shielding coating, and a reflection-preventing membrane formation processes that forms a reflection-preventing membrane at least on the surface of the resin layer.

15 Claims, 9 Drawing Sheets

RESIN-COUPLED OPTICAL ELEMENT AND METHOD OF PRODUCTION

BACKGROUND OF THE INVENTION

1. Field of the Invention

The present invention relates to optical elements having resin layers and methods of producing such elements, and more particularly, to a resin-coupled aspherical lens having a glass or plastic base material with a spherical surface or a rough aspherical surface and a resin layer with an aspherical surface, and the method of producing such a lens.

2. Description of Related Art

A known aspherical lens structure is shown in FIGS. 3 and 4. FIG. 3 shows a glass or plastic base material 1 having a spherical surface, and FIG. 4 shows an example of such base material 1 having a rough aspherical surface, as disclosed in Japanese Laid-Open Patent Application No. 63-157103.

With the conventionally known aspherical surface, thin (5–100 μm) resin layer 2 is layered on glass or plastic base material 1. With the method generally used for producing this kind of aspherical lens, resin layer 2 is formed using ultraviolet-hardening resin.

With this method of formation it is easy to obtain an aspherical lens having an optical surface of a desired shape, because the optical surface is formed using a malleable ultraviolet-hardening resin fluid. This method lends itself well to mass production. An example of this conventionally known method of producing resin-coupled aspherical lenses is shown in FIGS. 5A–5E for cases in which glass base material 1 possesses a spherical surface.

First, the spherical glass lens (FIG. 5A) is produced using common base material production methods. Melted glass is shaped by pressing, and the resulting glass block is manufactured into a lens having the desired spherical surface by machine processing. Next, reflection-preventing membrane 4 is coated on one surface of the lens produced by the base material production process, by a reflection-preventing membrane formation process (FIG. 5B). Furthermore, by a resin layer formation process (FIG. 5C), an ultraviolet-hardening resin fluid is coated on the surface of the base material on which reflection-preventing membrane 4 is formed by the reflection-preventing membrane formation process. The resin fluid coating forms resin layer 2. The surface on which resin layer 2 is formed will be referred to hereafter as the front surface of the lens. After formation of resin layer 2, reflection-preventing membrane 5 is coated on the front surface, on which resin layer 2 is formed, by a front surface reflection-preventing membrane formation process (FIG. 5D). Lastly, during a light-shielding membrane formation process (FIG. 5E), a light-shielding coating is applied so as to cover the outermost perimeter of the lens, that is, the rough edge area, and the outer perimeter of reflection-preventing membrane 5. The coating is baked on to form light-shielding membrane 3. When black ink is used as the light-shielding coating, it is not heated but rather is allowed to dry naturally.

The edge of the lens produced using this method is shown in FIG. 2. With conventional methods of production, after resin layer 2 has been formed, reflection-preventing membrane 5 is coated onto the surface of resin layer 2, following which light-shielding membrane 3 is formed on the outer perimeter, that is, the rough area, of the lens and the outermost perimeter of reflection-preventing membrane 5. Consequently, the edge of resin layer 2 is covered by the reflection-preventing membrane 5.

However, with a resin-coupled aspherical lens produced using the described production process, edge surface 6 of the outermost perimeter of resin layer 2 shines in a ring-like manner when viewed from the back surface of the lens (the surface on which resin layer 2 is not formed). This condition is shown in FIGS. 8A–8C. Each of the FIGS. 8A–8C shows the area around the perimeter of a lens produced using conventional technology, as viewed from the back surface. FIG. 8A is magnified 10 times, FIG. 8B 20 times and FIG. 8C 40 times. In addition, FIGS. 9A–9C are photographs of the area around the perimeter of a lens produced using conventional technology, the photograph being taken from the back surface. FIG. 9A is magnified 10 times, FIG. 9B 20 times and FIG. 9C 40 times.

In both FIGS. 8A–8C and FIGS. 9A–9C, outer perimeter E of the lens, in which the edge surface of the outermost perimeter of resin layer 2 is reflective, and a ring-like region of light r are observable. With this ring-like region of light r, reflection is not uniform, as spots w are visible and form knots in the ring. This kind of ring-like and non-uniform reflection give a poor outer appearance, which, in some cases, is undesirable. When viewed through the lens, the reflection from edge surface 6 of the outermost perimeter of resin layer 2 is close to complete reflection and is seen as an extremely bright light. Furthermore, it is positioned in a place where reflection of the penetrating light stands out easily.

SUMMARY OF THE INVENTION

To address the above and other problems, it is an object of the present invention to provide a lens production method that will improve the quality of the outer appearance of the lens by decreasing the reflection of the edge surface of the outermost perimeter of the resin layer, without decreasing manufacturing capability.

To achieve the above and other objects, an optical element according to an embodiment of the invention includes a base material, a resin layer disposed on at least one surface of the base material, and a light-shielding membrane disposed on at least a portion of the resin layer. The light-shielding membrane preferably covers an edge surface of an outermost perimeter of the resin layer. A reflection-preventing membrane preferably is disposed on at least a portion of the resin layer, so that the light-shielding membrane separates the reflection-preventing membrane from the edge surface of the outermost perimeter of the resin layer.

According to another aspect of the invention, a method of producing a resin-coated optical element includes the steps of forming a resin layer on at least one surface of a base material of the optical element, forming a light-shielding membrane on at least a portion of the resin layer, and forming the reflection-preventing membrane on at least a portion of the resin layer. The step of forming the light-shielding membrane preferably includes the step of forming the light-shielding membrane on an edge surface of an outermost perimeter of the resin layer and also preferably includes the step of forming a portion of the light-shielding membrane on at least one surface of the base material. The step of forming the reflection-preventing membrane preferably includes the step of forming the reflection-preventing membrane on 1) the portion of the light-shielding membrane disposed on the surface of the base material and 2) the portion of the light-shielding membrane disposed on the portion of the resin layer.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
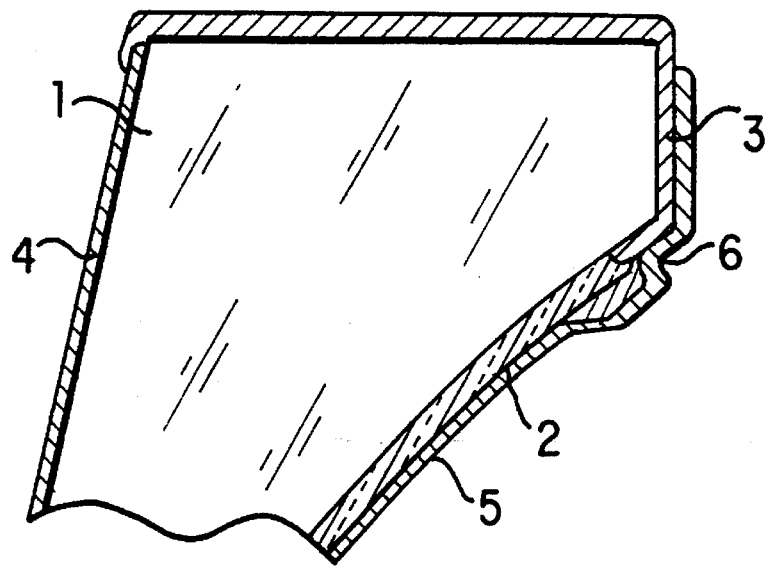
FIG. 1 is a cross-sectional view showing the area near the outer perimeter of a lens according to an embodiment of the present invention.
Figure 2:
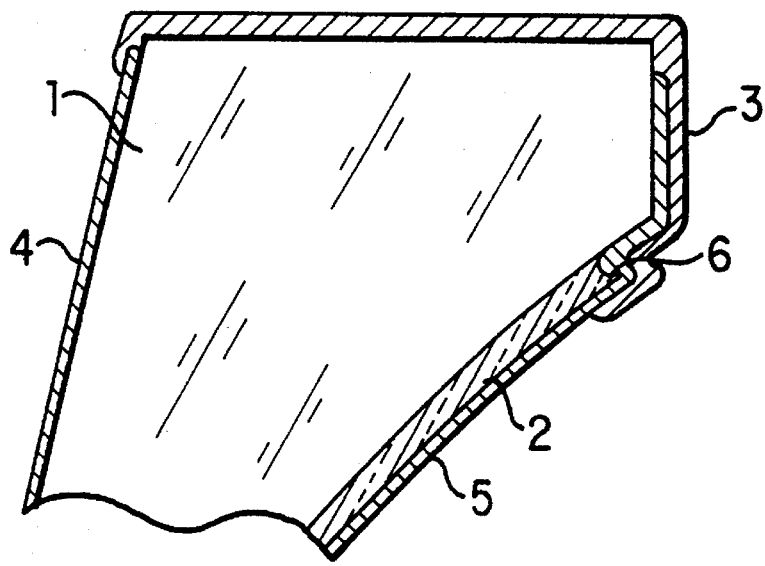
FIG. 2 is a cross-sectional view showing the area near the outer perimeter of a lens produced using conventional production methods.

The outer perimeter of a lens according to the present invention is shown in FIG. 1. With the present invention, after resin layer 2 is formed, light-shielding membrane 3 is first formed on edge surface 6 of the outermost perimeter of the resin layer 2, following which reflection-preventing membrane 5 is formed. In this manner, it is possible to reduce the reflection of edge surface 6 of the outermost perimeter of resin layer 2.

Figure 3:
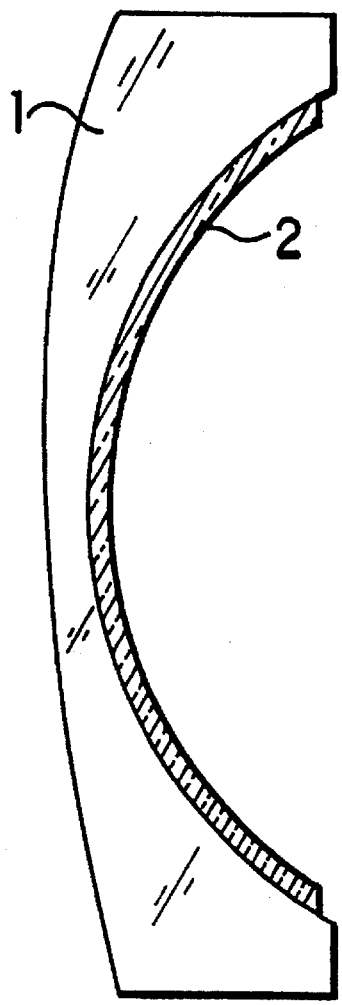
FIG. 3 is a vertical cross-sectional view of a known lens with a complex aspherical surface having a spherical base material.
Figure 4:
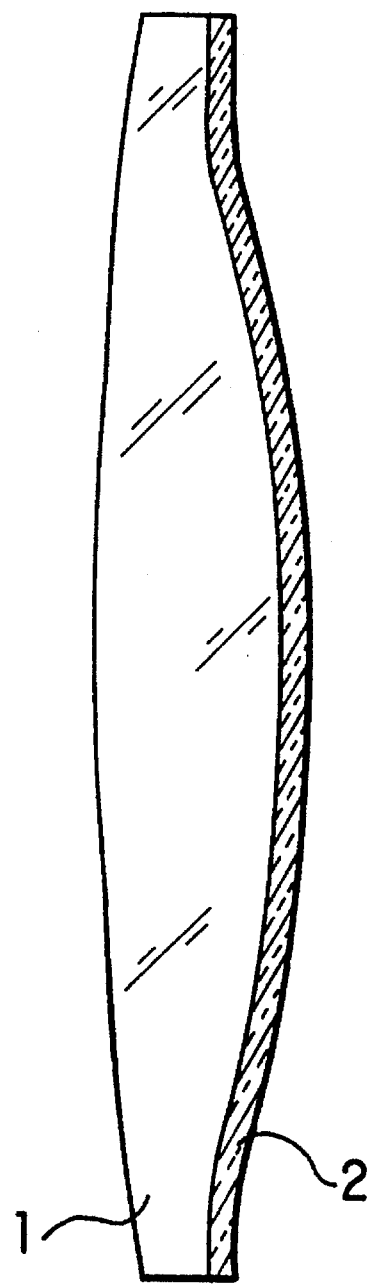
FIG. 4 is a vertical cross-sectional view of a known lens with a complex aspherical surface having a rough aspherical base material.
Figure 5A:
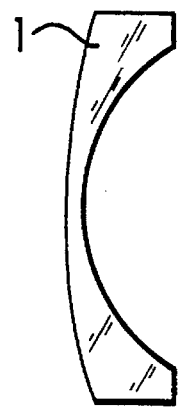
FIGS. 5A–5E are vertical cross-sectional views of a lens during the various steps of a conventional production method.
Figure 5B:
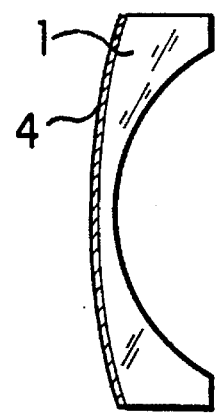
Figure 5C:
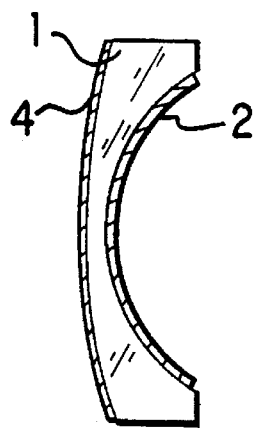
Figure 5D:
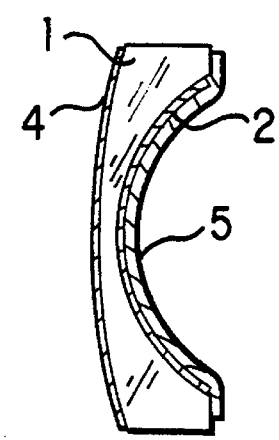
Figure 5E:
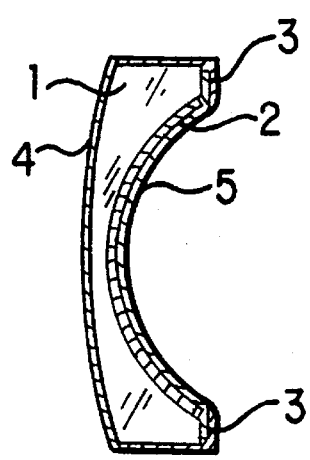
Figure 6:
FIG. 6 is a cross-sectional view of a lens having a resin layer on both its concave surface and its convex surface.

The present invention can be applied to a lens having resin layer 2 on the concave side of the base material, as shown in FIG. 3, or to a lens having resin layer 2 on the convex side, as shown in FIG. 4. In addition, the present invention is not limited to aspherical lenses having resin layer 2 on either the concave or convex side of base material lens 1, but it can also be applied to a lens having resin layer 2 on both the convex and concave sides of base material lens 1, as shown, for instance, in FIG. 6.

FIG. 1 is a cross-sectional view of an area near the outer perimeter of a lens according to an embodiment of the present invention. With this embodiment, edge surface 6 of the outermost perimeter of resin layer 2, which is formed on the front surface of glass base material lens 1, has a spherical surface and is covered by light-shielding membrane 3. The thickness of resin layer 2 is preferably in the range of 5–100 μm at the center, for instance, but the present invention does not depend upon the thickness of resin layer 2. In addition, because lens 1 preferably is made of glass base material, a lens having an outer diameter of 15–40 mm and a center thickness of 1–10 mm may be used, but it is also possible to use a lens larger than this. In addition, it is possible to use a lens in which both surfaces have been polished into a spherical surface, but it is also possible to use a lens in which one of the surfaces or both of the surfaces are aspherical. Furthermore, the base material of the lens is not limited to glass. It is also possible to use plastic as the base material of the lens.

According to the present embodiment of the invention, a resin-coupled lens having an aspherical surface is produced using the method described hereafter. The steps in production are shown in FIGS. 7A–7E.

(1) According to this embodiment, a glass base material is used for lens 1, which has a diameter of 33 mm, a radius of curvature R1 for the convex surface of 89.5 mm, a radius of curvature R2 for the concave surface of 19.0 mm, and a central thickness of 1.6 mm. Lens 1 has both surfaces polished into spherical surfaces. Opposite to the side of lens 1 coupled with resin layer 2, that is, on the side of lens 1 having a concave surface, a front surface reflection-preventing membrane 4 preferably already is formed. In addition, lens 1 preferably undergoes a silane coupling process on its front surface in order to enhance its adhesion with resin layer 2. As the silane coupling agent for the silane coupling process, KBM503 (produced by Shin-Etsu Chemical Co.), diluted in ethanol to a 2% concentration by weight, preferably is used.

Figure 7A:
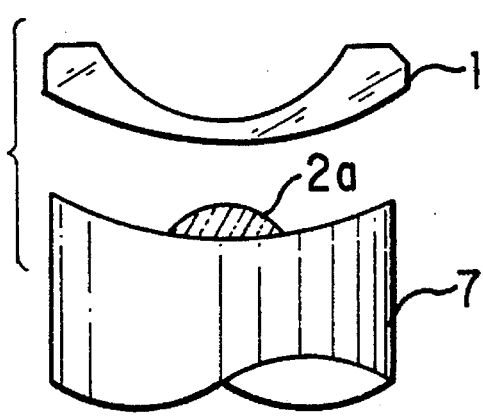
FIGS. 7A–7E show the various steps of a production method according to an embodiment of the present invention.

(2) Resin layer 2 is formed on lens 1, which preferably is formed of a glass base material. To form the aspherical surface of resin layer 2, metal mold 7 is prepared with an inverted aspherical surface. This aspherical surface preferably is dimensioned so that the curvature of the resin surface is 18.5 mm. To form resin layer 2, 60 mg of ultraviolet light-hardening resin fluid 2a is dripped into metal mold 7 (FIG. 7A). According to the present embodiment, a urethane acrylate resin preferably is used as the ultraviolet light-hardening resin to form resin layer 2. This resin preferably has an expansion/contraction ratio of about 7%.

Figure 7B:
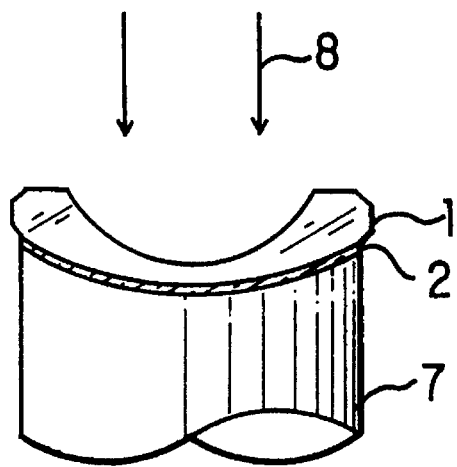

Subsequently, lens 1 is pressed against metal mold 7, into which resin fluid 2a has been dripped, so that resin fluid 2a fills the space between metal mold 7 and lens 1. The space between metal mold 7 and lens 1 is set so that the central thickness of the resin preferably is 70 μm. Next, a 150 W xenon lamp preferably is used, from the concave surface side of lens 1, to illuminate resin layer 2 with ultraviolet rays 8 for 60 seconds (FIG. 7B).

Figure 7C:
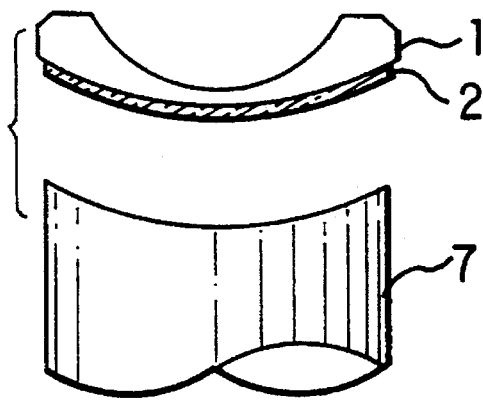

A lens with an aspherical surface similar to the one shown in FIG. 4 is thus obtained by removing the lens, with its aspherical surface resin layer 2 obtained in the manner described, from metal mold 7 (FIG. 7C).

Figure 7D:
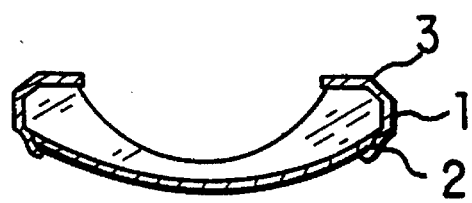

(3) Next, a light-shielding coating is applied to the rough area along the outer perimeter of the resulting lens and to the outer perimeter of resin layer 2, thereby forming light-shielding membrane 3 (FIG. 7D). Subsequently, the lens is baked preferably for one hour at 70° C. in order to solidify this coating material. As a light-shielding coating that does not harm acrylic resin, an acrylic urethane resin coating, mixed with a silane coupling agent, preferably is used.

Figure 7E:
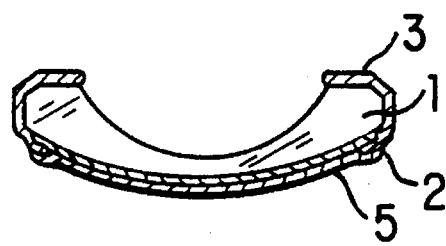

(4) Lastly, reflection-preventing membrane 5 made of multiple inorganic membrane layers is coated onto the front surface of resin layer 2 (FIG. 7E).

Figure 8A:
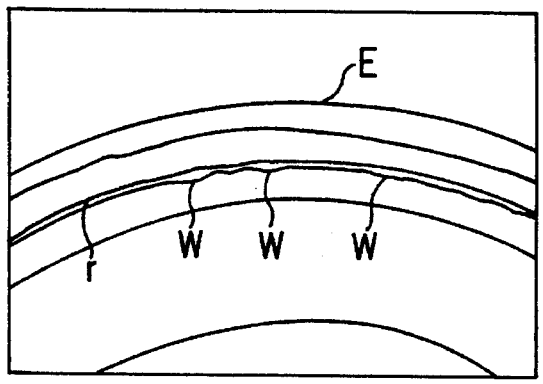
FIGS. 8A–8C show a reflection of an edge surface of a resin membrane in a lens produced using conventional technology.
Figure 8D:
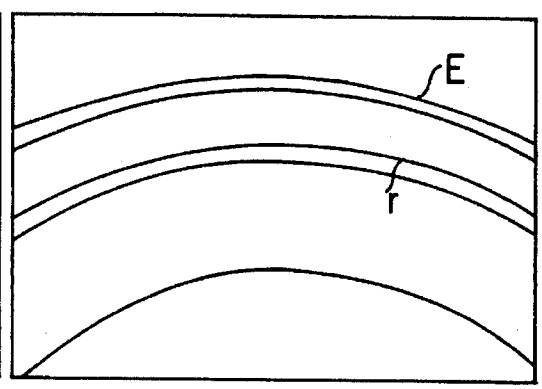
FIGS. 8D–8F show a reflection of an edge surface of a resin membrane in a lens produced according to the present invention.
Figure 8B:
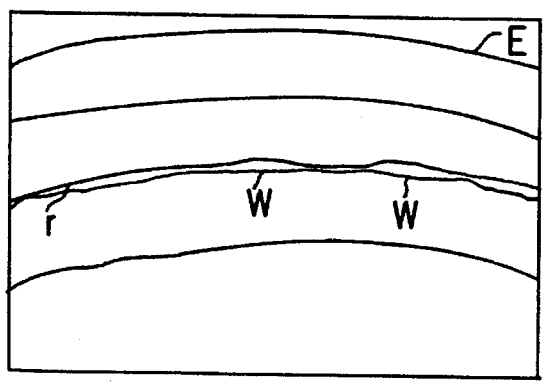
Figure 8E:
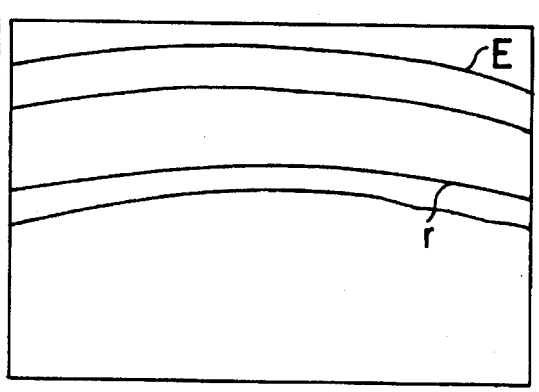
Figure 8C:
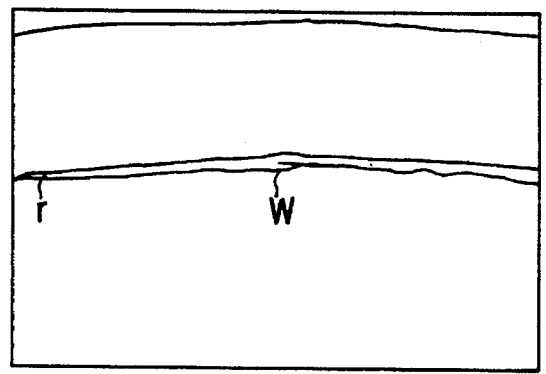
Figure 8F:
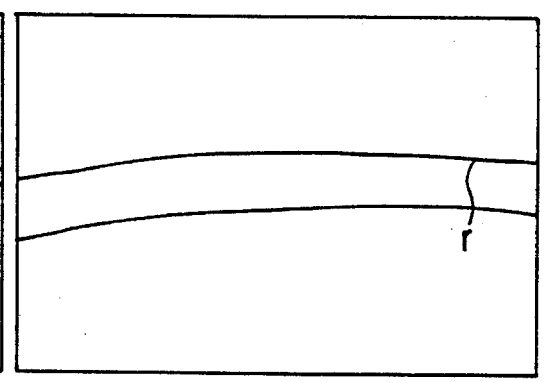
Figure 9A:
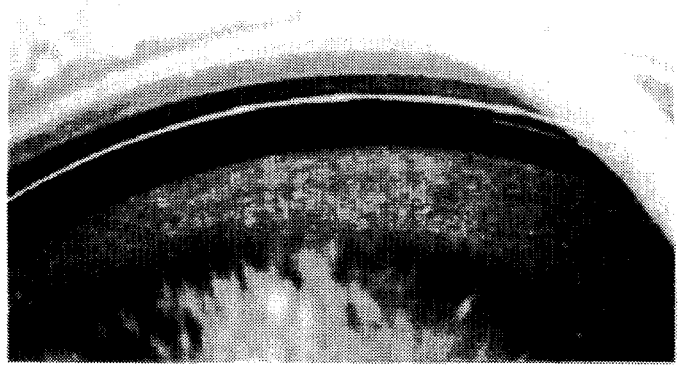
FIGS. 9A–9C are enlarged photographs showing a reflection of an edge surface of a resin membrane in a lens produced using conventional technology.
Figure 9B:
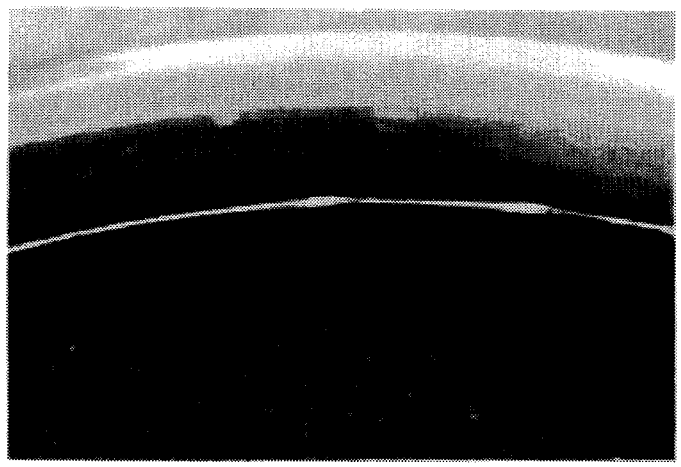
Figure 9C:
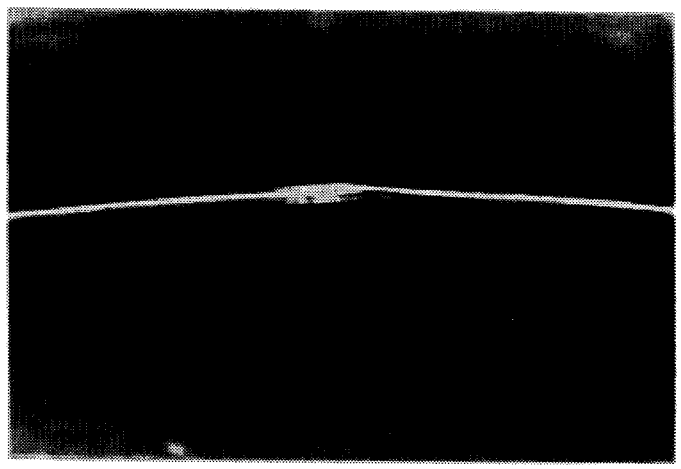
Figure 9D:
FIGS. 9D–9F are enlarged photographs showing a reflection of an edge surface of a resin membrane in a lens produced according to the present invention.
Figure 9E:
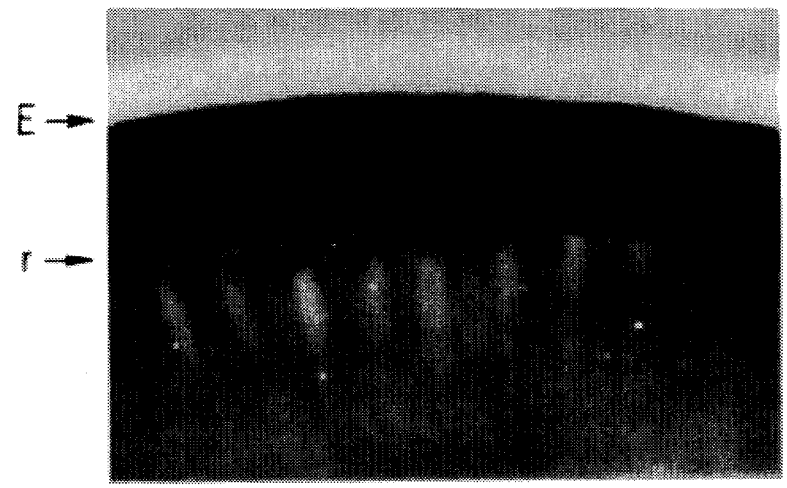
Figure 9F:

The area near the outer perimeter of the resin-coupled lens, formed according to the invention in the manner described above, is shown in FIGS. 8D–8F. FIG. 8D is magnified 10 times, FIG. 8E times and FIG. 8F 40 times. In addition, FIGS. 9D–9F are photographs of the area near the outer perimeter of a lens produced according to the invention, as viewed from the rear surface. FIG. 9D is magnified 10 times, FIG. 9E 20 times and FIG. 9F 40 times. In FIGS. 8D–8F and FIGS. 9D–9F, perimeter E of the lens is shown. Even with the magnification in FIGS. 8D–8F and 9D–9F, the region of ring-shaped light r was only slightly apparent. With the resin-coupled lens according to the preferred embodiment, the reflection at edge surface 6 of the outermost perimeter could not be observed by the naked eye, and the reflection did not have any detrimental effect on the quality of the external appearance of the lens.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An optical element comprising:
    a base material having at least one side and an edge area adjacent to the side;
    a resin layer disposed on at least one surface of the base material on the at least one side of the base material and having an outer perimeter located adjacent to the edge area of the base material; and
    a light-shielding membrane layer disposed directly on the edge area of the base material and on at least a portion of the resin layer located adjacent to the edge area on the at least one side of the base material.

2. The optical element according to claim 1, wherein:
    the outer perimeter of the resin layer includes an edge surface; and
    the light-shielding membrane layer covers and contacts the edge surface of the outermost perimeter of the resin layer.

3. The optical element according to claim 2, further comprising a reflection-preventing membrane layer disposed on the at least one side of the base material on at least a portion of the resin layer, wherein the light-shielding membrane layer separates the reflection-preventing membrane layer from the edge surface of the outermost perimeter of the resin layer.

4. The optical element according to claim 1, wherein at least one surface of the optical element is aspherical.

5. The optical element according to claim 1, further comprising a reflection-preventing membrane layer disposed on the at least one side of the base material on at least a portion of the resin layer.

6. The optical element according to claim 5, wherein the reflection-preventing membrane layer covers at least a portion of the light-shielding membrane layer, so that a portion of the light-shielding membrane layer is disposed between the base material and the reflection-preventing membrane layer.

7. The optical element according to claim 5, wherein a portion of the light-shielding membrane layer is disposed between the resin layer and the reflection-preventing membrane layer.

8. An optical element comprising:
    a base material having front and rear sides and an edge area extending between the front and rear sides;
    a resin layer supported by the base material on at least the front side of the base material and having an outer perimeter located adjacent to the edge area of the base material;
    a reflection-preventing membrane layer supported by the base material on at least the front side of the base material; and
    a light-shielding membrane layer directly supported by the base material on at least the edge area on the front side of the base material, a portion of the light-shielding membrane layer being disposed between the reflection-preventing membrane layer and the resin layer.

9. The optical element according to claim 8, wherein the portion of the light-shielding membrane layer covers an edge surface of the resin layer.

10. A method of producing a resin-coated optical element, comprising the steps of:
    forming a resin layer on at least one surface of a base material of the optical element, the resin layer formed to extend to an outer perimeter located adjacent an edge area of the base material;
    forming a light-shielding membrane layer directly on at least a portion of the edge area of the base material and directly on at least a portion of the resin layer; and
    forming a reflection-preventing membrane layer on at least a portion of the resin layer.

11. The method according to claim 10, wherein the step of forming the light-shielding membrane layer includes applying a light-shielding coating directly to the edge area of the base material.

12. The method according to claim 11, wherein the step of applying the light-shielding coating includes applying an acrylic urethane resin coating mixed with a silane coupling agent to the edge area of the base material.

13. The method according to claim 10, wherein the step of forming the light-shielding membrane layer includes forming the light-shielding membrane layer directly on an edge surface of the outermost perimeter of the resin layer.

14. The method according to claim 10, wherein the step of forming the reflection-preventing membrane includes forming the reflection-preventing membrane layer on at least a portion of the light-shielding membrane layer.

15. The method according to claim 10, wherein the step of forming the reflection-preventing membrane layer includes forming the reflection-preventing membrane layer on 1) the portion of the light-shielding membrane layer disposed on the edge area of the base material and 2) the portion of the light-shielding membrane layer disposed on the portion of the resin layer.

\* \* \* \* \*